United States Patent [19]
Nakazawa et al.

[11] Patent Number: 5,682,566
[45] Date of Patent: Oct. 28, 1997

[54] FILM TRANSPORT APPARATUS

[75] Inventors: Makoto Nakazawa; Masaaki Orimoto; Sueo Itoh; Shouji Watanabe, all of Asaka, Japan

[73] Assignee: Fuji Photo Film Co., Ltd., Kanagawa, Japan

[21] Appl. No.: 531,082

[22] Filed: Sep. 20, 1995

[30] Foreign Application Priority Data

Sep. 30, 1994 [JP] Japan .................................. 6-237040

[51] Int. Cl.[6] .................................................. G03B 17/00
[52] U.S. Cl. .................................. 396/415; 396/440
[58] Field of Search ........................... 396/387, 411, 396/415, 440, 535

[56] References Cited

U.S. PATENT DOCUMENTS 5,502,528  3/1996  Czarnecki et al. .................. 396/415

Primary Examiner—David M. Gray
Attorney, Agent, or Firm—Sughrue, Mion, Zinn, Macpeak & Seas, PLLC

[57] ABSTRACT

A contact position at which the photographic film sent out from a film cartridge first contacts a film guide means is determined in such a manner that the photographic film does not contact a film entrance of the film cartridge when a film winding diameter in the film cartridge is at its maximum, and that only the edges of the photographic film, which curls in a direction of its breadth, which is not an image area, contacts the film entrance when the film winding diameter is at its minimum. As a result, the image area on the film is not damaged if the film is transported back and forth many times, and dust which causes damage to the film can be reduced.

6 Claims, 5 Drawing Sheets

FILM TRANSPORT APPARATUS

BACKGROUND OF THE INVENTION

1. Field of the Invention

The present invention relates to a film transport apparatus and more particularly to a film transport apparatus which is applied to a film scanner, etc. employing a film cartridge in which a photographic film is wound around a single spool.

2. Description of the Related Art

In conventional film cartridges, a leader part of a photographic film strip is exposed from a film cartridge before the photographic film has been used.

In a film cartridge disclosed in U.S. Pat. No. 4,933,693, if the photographic film of the film cartridge has not been used, all of the photographic film strip is stored within the film cartridge, that is, a leader part of the photographic film is not exposed from the film cartridge.

A film transport apparatus for the above-described film cartridge is shown in FIG. 5.

As shown in FIG. 5, a spool 14 is rotated in order to send out the film strip which is wound around the spool 14 from a film entrance of the film cartridge 10. The film strip 12 being sent out from the film cartridge 10 is wound around a winding reel (not shown in the drawing) and is guided by guide plates 20 and 22. Tapered end parts 20A and 22A are formed in the guide plates 20 and 22 in such a manner to face the film entrance of the film cartridge 10, so that a forward end of the film strip is guided into between guide plates 20 and 22.

On the other hand, a film scanner has been proposed, which moves a developed photographic film at a fixed speed and reads a film image from the film by means of a CCD line sensor (Japanese Patent Application Laid-open No. 5-5021053 and No. 63-39267).

Here, the film strip 12 usually coils as shown in FIG. 6(A). When the coiling film strip is stretched, the film curls in a direction of its breadth as shown in FIG. 6(B). Accordingly, the guide plate 20 is made to contact the whole surface of the film in order to obtain the same flatness of the image area as that at photographing.

As shown in FIG. 5, a film winding diameter in the film cartridge 10 is changed, so the entering angle of the film strip 12 into the guide plates 20 and 22 is also changed. Therefore, depending on the entering angle, there is a problem in that the film strip 12 is forced to contact the edge of the film entrance before the film enters between guide plate 20 and 22. Here, the film entrance is formed as a minimum size in view of a light-shielding property. Accordingly, the film entrance can not be formed large enough to prevent the above-mentioned problem.

In the case where the above-described film transport apparatus is used in a camera, the film is transported forward and backward only once. However, the film is transported forward and backward many times when the apparatus is used in a film scanner, and in this case the film might be damaged and dust might collect.

SUMMARY OF THE INVENTION

The present invention has been developed in view of the above-described circumstances, and has its aim the provision of a film transport apparatus for transporting a photographic film without damaging an image area of the film and without collecting dust.

To achieve the above-described object, in a film transport apparatus including a film feeding means in which a film cartridge winding a photographic film around a single spool thereof is mounted, the film winding means has a winding reel for winding the photographic film sent out by the film feeding part, and a film guide means arranged between the film cartridge and the film winding means, a contact position at which the photographic film sent out from the film cartridge contact the film guide means at first is determined in such a manner that the photographic film does not contact a film entrance of the film cartridge when a film winding diameter in the film cartridge is at its maximum, and that only both edges of the photographic film which are curled in a breadth direction thereof, which are not image areas, contact the film entrance when the film winding diameter is the minimum.

At the time of film transport, there is a problem in that the photographic film contacts the film entrance of the film cartridge. As a result, the image area on the film is damaged and dust is collected.

In view of the above-described problem, the present invention is aimed at obtaining a suitable positional relationship between the film cartridge and the film guide part.

That is, the film sent out from the film cartridge first contacts the film guide part such that the film does not contact the film entrance when the film wind diameter in the film cartridge is at its maximum, and such that two edges of the film (which are not an image area) contact the film guide part because of the film curling in its breadth direction when the film wind diameter is at its minimum.

Consequently, when the film winding diameter is at its maximum, the film does not contact film entrance, and when the film winding diameter is the minimum, not the image area but both edges of the film contact the film entrance. That is, when the film wind diameter is at its minimum, only two edges of the film are slightly contacted with the film entrance (in the range where the film curls in its breadth direction). That is, the image area of the photographic film does not contact with the film entrance.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will hereunder be given of the preferred embodiment of a film transport apparatus according to the present invention with reference to the accompanying drawings.

Figure 1:
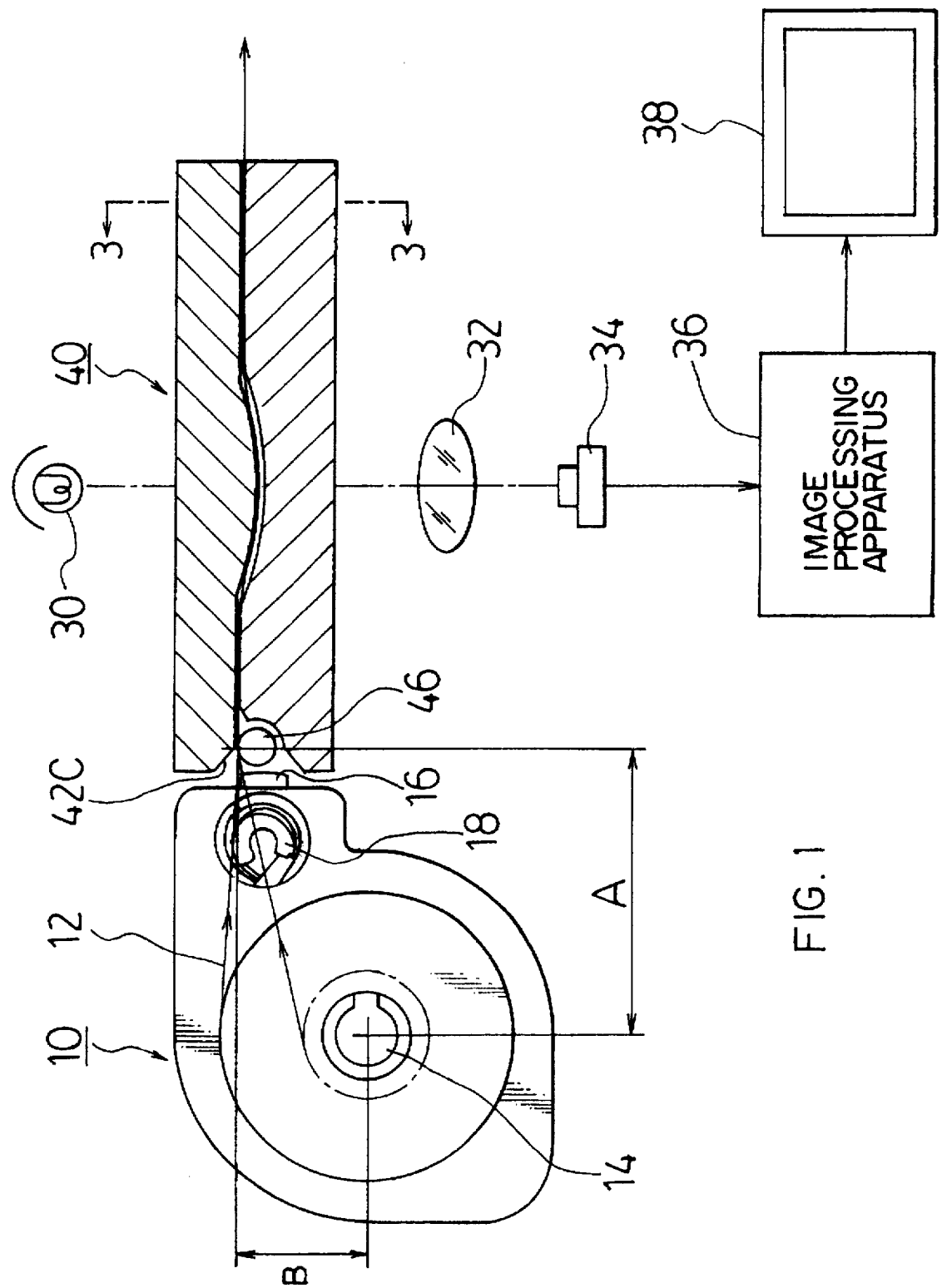
FIG. 1 is a view illustrating essential portions of a film scanner including a film transport apparatus according to the present invention.

FIG. 1 is a view illustrating essential portions of a film scanner including a film transport apparatus according to the present invention.

As shown in FIG. 1, the film scanner mainly comprises a film transport apparatus, a fluorescent light 30 for illumination, a taking lens 32, a CCD line sensor 34, an image processing apparatus 36, and so forth.

Figure 5:
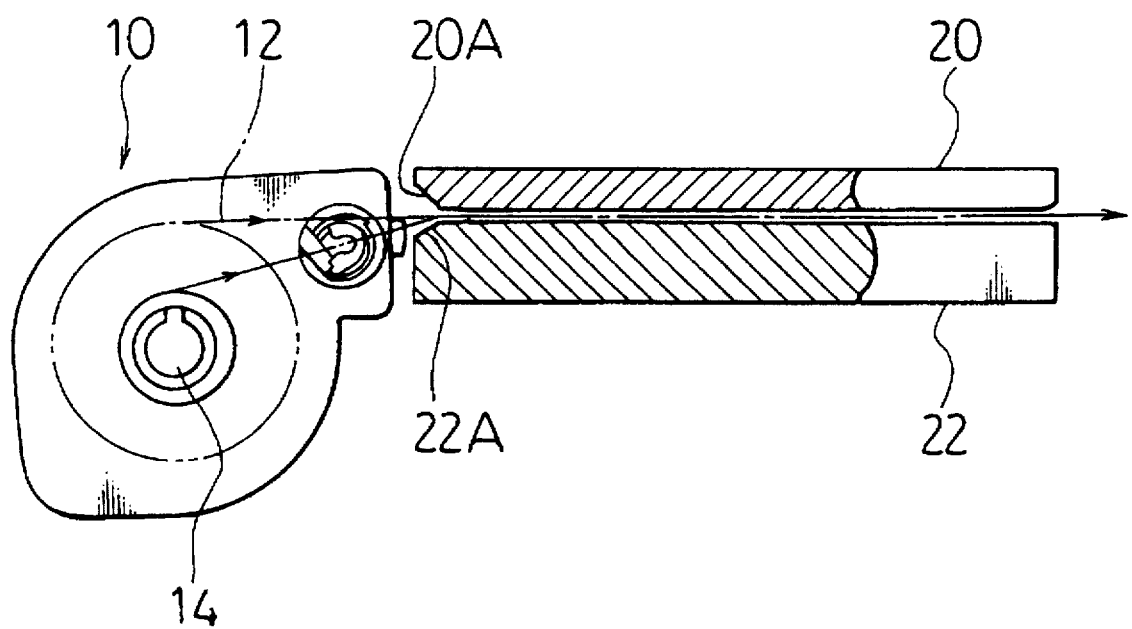
FIG. 5 is a view of essential parts illustrating one example of a film transport apparatus.

In a film cartridge 10 used in the film scanner, a roll of developed photographic film 12 is wound around a single spool 14 as shown in FIG. 5. When the cartridge is taken out, the whole film 12 is wound up so that the film can be stored. A lid 16 is provided at an film entrance of the film cartridge 10, which can be opened and closed (not shown in the drawing). A lid opening and closing member 18 is rotated so as to open and close the lid 16.

In FIG. 1, the fluorescent light 30 is arranged in such a manner that its longitudinal direction is perpendicular to a transport direction of the film 12, so that the film 12 can be illuminated in its breadth direction. Transmitted light, which is transmitted through the film 12, is formed on a light-accepting surface of the CCD line sensor 34, which is arranged in a perpendicular direction to the film transport direction, through the taking lens 32. As described later, the film 12 is transported at a fixed speed so that the film image can be read.

In sensors provided with filters R, G and B respectively, the image light which is formed on the light-accepting surface of the CCD line sensor 34, is electrically charged so that it can be converted into signal electric charges R, G and B in accordance with each light strength. A shift register reads out the accumulated signal electric charge by means of a transfer gate pulse applied by a CCD drive circuit (not shown in the drawing), and then the accumulated signal electric charge is sequentially read by means of a register transfer pulse.

When the film image is read, signals R, G and B in one frame are read from the CCD line sensor and are sent to the image processing apparatus 36. The image processing apparatus 36 converts the signals R, G and B of one frame into digital signals R, G and B by means of an A/D convertor which is not shown in the drawing. The digital signals R, G and B are variously signal-precessed and then stored in an image memory. The signals R, G and B stored in an image memory are repeatedly read out, and are converted into analog signals by a D/A convertor. Then, the signals R, G and B are converted into composite video signals of NTSC system by an encoder and are transmitted to a TV monitor 38. As a result, it is possible to display the film image on the TV monitor 38.

Next, an explanation will be given of the film transport apparatus according to the present invention. The film transport system comprises a film feeding part, a film winding part, a capstan (not shown in the drawing), and a film guide part 40.

In a film feeding part, the film cartridge 10 is mounted, and the spool 14 is rotated clockwise in FIG. 1 so as to send out the film 12. When the film 12 is wound into the film cartridge 10, the spool 14 is rotated counterclockwise in FIG. 1. The film winding part has a winding reel, the winding reel is rotated so as to wind up the film 12 being sent from the film feeding part. The film is transported at a predetermined speed while being held between the capstan and a pinch roller.

Next, a detailed explanation will be given of the film guide part 40.

The film guide part 40 guides the film 12 in order that the picking-up is well carried out at a picking-up position. It comprises a first guide plate 42, a second guide plate 44, and a guide roller 46.

Figure 2:
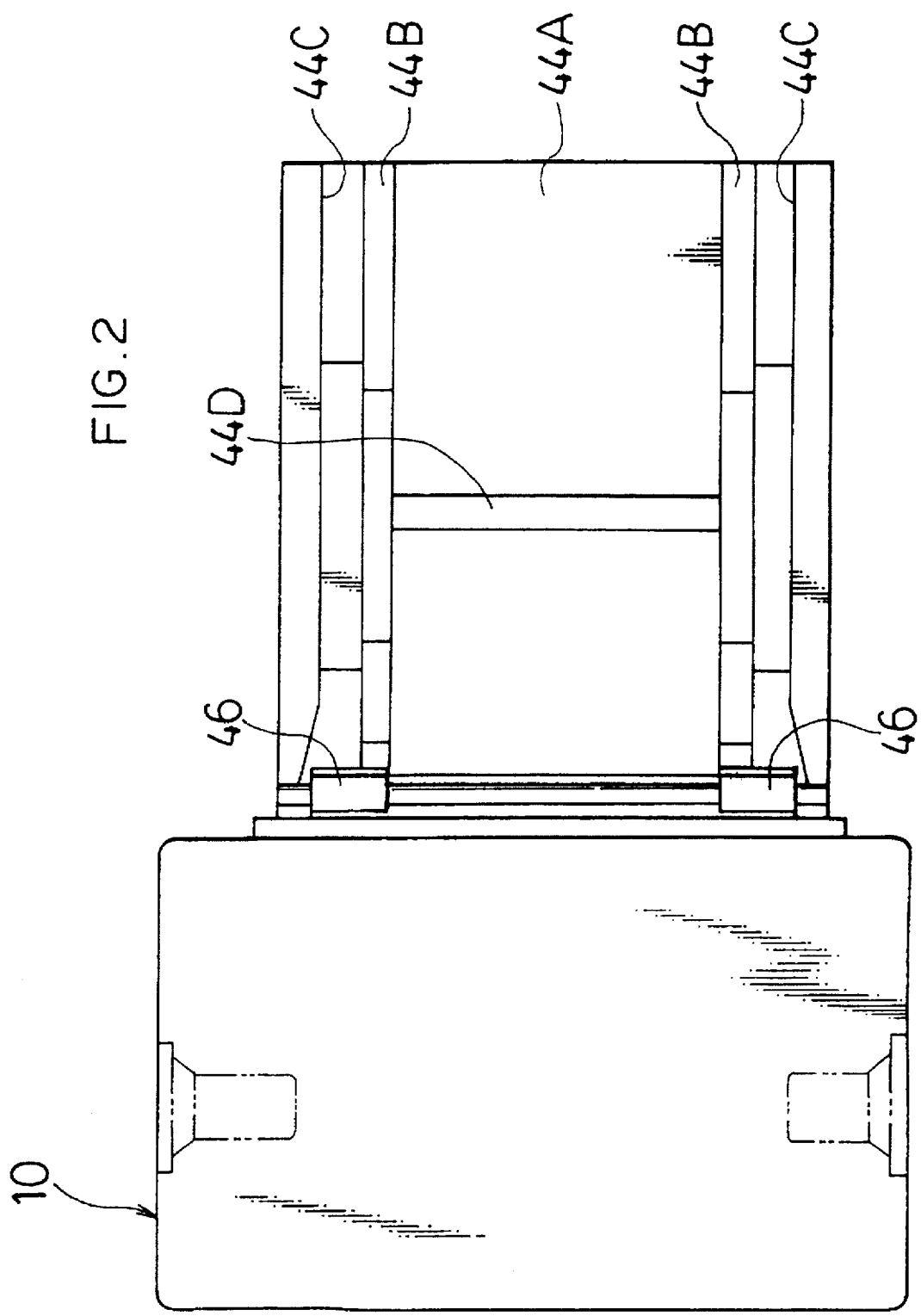
FIG. 2 is a plan view of FIG. 1 taken from a fluorescent light in a state that a first guide plate is removed.
Figure 3:
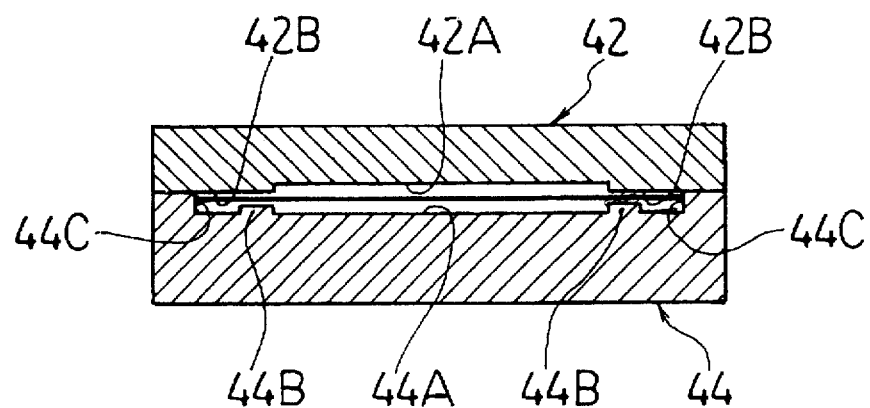
FIG. 3 is a sectional view taken along line 3—3 of FIG. 1.

FIG. 2 is a plan view of FIG. 1 taken from a fluorescent light in a state that a first guide plate is removed, and FIG. 3 is a sectional view taken along line 3—3 of FIG. 1.

As shown in FIG. 3, a concave portion 42A is formed in such a manner to face an image area of the film 12. Guide surfaces 42B are formed to contact only the edges of the film 12. That is, the guide surfaces 42B do not contact the image area of the film 12. Similarly, as shown in FIGS. 2 and 3, a concave portion 44A is formed in such manner to face the image area on the film 12, having ribs 44B which include guide surfaces facing the guide surfaces 42B of the first guide plate 42. Furthermore, guide surfaces 44C are formed to regulate the movement of the film 12 in its breadth direction.

In the concave portion 42A of the first guide plate 42 and in concave, portion 44A of the second guide plate 44, a window for illumination (not shown in the drawing) and a window 44D for a line sensor reading are provided. Moreover, at the part near both of these windows, the guide surfaces 42B are formed to be curved in a convex shape, and the ribs 44B for guiding are formed to be curved in a concave shape.

As shown in FIGS. 1 and 2, the guide roller 46 is rotatably arranged at a film entrance of the first guide plate 42 and the second guide plate 44 in such a manner to contact only the edges of the film 12. That is, the guide roller 46 does not contact the image area of the film 12.

An explanation will be given of the operation of the film transport apparatus which is constructed in the above-mentioned manner.

First, when the film cartridge 10 is mounted in the film supply part, the film-loading is started automatically or with an instruction for loading. That is, in FIG. 1, the spool 14 of the film cartridge 10 is rotated clockwise. When the spool 14 of the film cartridge 10 is rotated clockwise, the wound film 12 slacks, so that the film 12 is sent out from the film entrance of the film cartridge 10.

The forward end of the film 12 is guided by a tapered surface 42C at the film entrance of the first guide plate 42, and by the guide roller 46, and is sent into a space between the second guide plate 44 and the first guide plate 42. Incidentally, in this embodiment, the forward end of the film enters the upper part of the guide roller 46, and is guided by the guide roller 46. After the film 12 is sent out up to the capstan which is not shown in the drawing, the film 12 is sent out by means of the capstan and is wound around the winding reel.

Figure 6A:
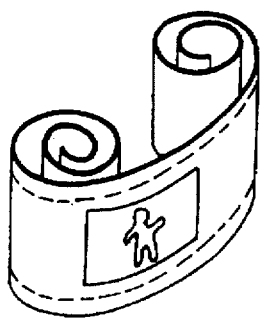
FIG. 6 (A) is a view illustrating a coiling photographic film strip, and FIG. 6 (B) is a view illustrating a photographic film strip which is curled in its breadth direction when being stretched.
Figure 6B:
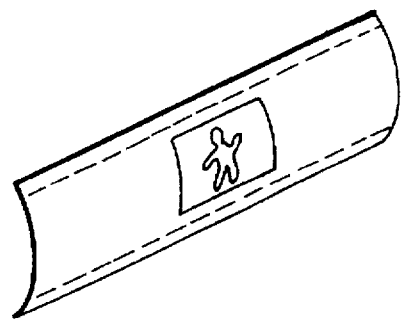

According to the film guide part 40 which is constructed in the above-mentioned manner, the film 12, which passes through the film guide part 40, is guided in such a manner that only the edges of the film 12 contact the film guide part 40. That is, the image area does not contact the film guide part 40. As a result, the image area is not damaged by the film guide part 40. Further, the film is curled in its breadth direction during transporting as shown in FIG. 6(B). The film strip is curled in its longitudinal direction near the window part for reading the film image (see FIG. 1) by means of the above-mentioned convex shape part of the guide surfaces 42B and the concave shape part of the ribs 44B, so that the film in its breadth direction is flattened. As a result, the surface of the film can be kept flat when the film is read by the CCD line sensor 34.

Next, an explanation will be given of a positional relationship between the film cartridge 10 stored in the film feeding part and the guide roller 46.

The spool 14 and the lid opening and closing member 18 of the film cartridge 14 are respectively coupled to a rotational axis and a drive axis for the lid opening and closing member 18 (both of which are not shown in the drawing) in the film feeding part, so that the film cartridge 10 can be positioned as predetermined.

Relating to the film cartridge 10 positioned in this way, the guide roller 46 is to be positioned as described below.

That is, the position at which the film 12 being sent out from the film cartridge 10 contacts the guide roller 46 is determined to satisfy following requirements 1) and 2).

1) A position at which the film 12 does not contact the film entrance of the film cartridge 10 when the film winding diameter in the film cartridge is the maximum.
2) A position at which only the edges of the film 12 which is curled in its breadth direction contact the film entrance of the film cartridge when the film wind diameter is at its minimum.

Consequently, when the film winding diameter is the maximum, the film 12 does not contact the film entrance. When the film winding diameter is at its minimum, both edges of the film contact the film entrance, that is, both edges of the film 12 slightly contact the film entrance (in the range where the film curls in its breadth direction). On the other hand, the image area of the film does not contact the film entrance.

Specifically, the film 12 is preferably in contact with the guide roller 46 at a position which is 16.3 mm away from a center of the spool 14 in a horizontal direction (distance A of FIG. 1 =16.3 mm), and is 7.1 mm away from the center of the spool 14 in a vertical direction (distance B of FIG. 1 =7.1 mm).

Figure 4:
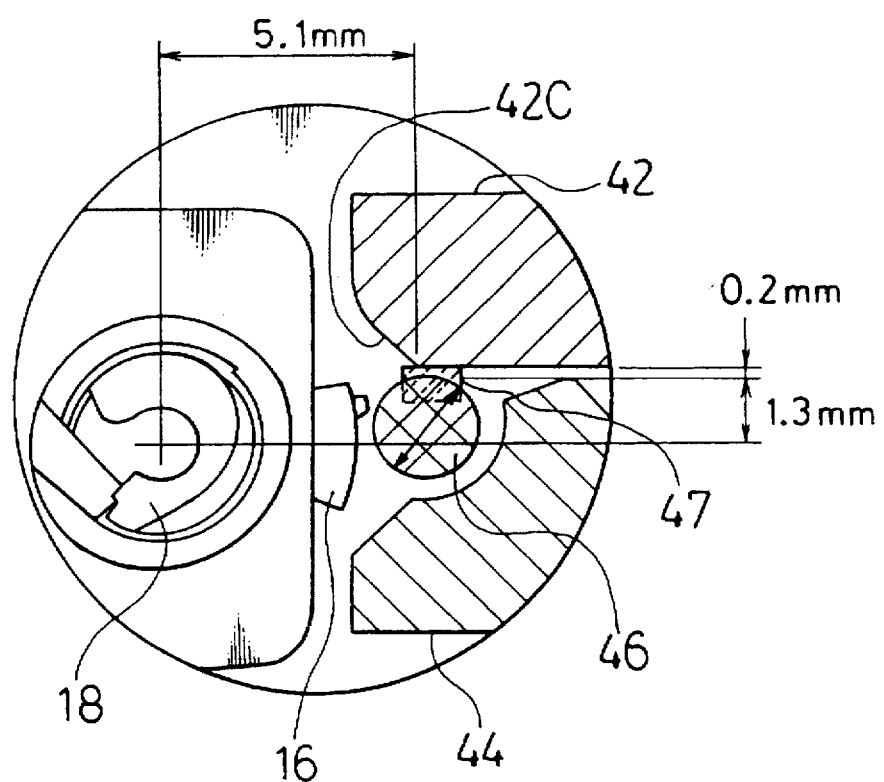
FIG. 4 is an enlarged view of essential portions of FIG. 1.

FIG. 4 is an enlarged view illustrating essential portions of FIG. 1. In FIG. 4, the position where the film 12 contacts the guide roller 46 is determined in accordance with a center of the lid opening and closing member 18. That is, the film 12 contacts the guide roller 46 at a position which is 5.1 mm away from a center of the lid opening and closing member 18 in a horizontal direction, and is 1.3 mm away from the center of the lid opening and closing member 18 in a vertical direction. Considering these values as reference values, if a position where the film 12 contacts the guide roller 46 is within a range 47 from −0.3 mm to +0.8 mm of the reference value in the horizontal direction, and within a range from −0.5 mm to +0.2 mm of the reference value in the vertical direction, the above-mentioned requirements 1) and 2) can be satisfied. The guide roller 46 is restricted in its size, and is 2 mm in diameter in this embodiment.

In this embodiment, the member, with which the film sent out from the film cartridge is first contacted, is the guide roller 46, however, the present invention is not limited to this. It is possible to use a guide pin which is not rotatable as the member. Also, a rib for guiding can be provided to the film at first. As long as the position where the film sent out from the film cartridge contacts first satisfies the requirements in 1) and 2), anything can be employed as the above-mentioned member.

As has been described above, according to the film transport apparatus of the present invention, a position where the film sent out from the film cartridge first contacts the film guide part is determined to be a suitable position. As a result, even if the film winding diameter in the film cartridge is changed, at least the image area on the film does not contact the film entrance of the film cartridge. As a result, the image area on the film is not damaged if the film is transported back and forth many times, and the dust which causes the damage to the film can be reduced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A film transport apparatus including film feeding means in which a film cartridge, having a photographic film wound around a single spool, is mounted, said film cartridge including a film entrance portion having an opening therein and film winding means having a winding reel for winding said photographic film withdrawn by said film feeding means, comprising;

film guide means disposed between said film cartridge and said film winding means, having a contact position at which said photographic film withdrawn from said film cartridge first contacts said film guide means, said contact position determined such that said photographic film does not contact said film entrance portion of said film cartridge when said film passes through said opening in a condition at which a film winding diameter in the film cartridge is at its maximum and such that only the edges of said photographic film, which are not an image area, contact said film entrance portion in a condition at which said film winding diameter is at its minimum.

2. The film transport apparatus according to claim 1, wherein:

said film guide means includes a guide roller or a guide pin which contacts only the edges of said photographic film which are not an image area; and said photographic film sent out from said film cartridge first contacts said guide roller or said guide pin.

3. The film transport apparatus according to claim 1, wherein:

said photographic film is a roll of developed photographic film; and said film guide means is provided with a window through which a line sensor reads an image of said photographic film while the film is being transported and a guide surface which guides said film by contacting only said edges of said photographic film which are not an image area.

4. The film transport apparatus according to claim 3, wherein said photographic film sent out from said film cartridge first contacts with an edge of said guide surface.

5. The film transport apparatus according to claim 3, wherein said guide surface is curved near said window in order to flatten a curl in a breadth direction of said photographic film for reading an image on said photographic film.

6. The film transport apparatus according to claim 2, wherein said film cartridge has a lid for covering said opening of said film entrance portion, and a lid opening and closing member for opening and closing said lid, and wherein a position where said photographic film contacts said guide roller or guide pin is located 4.8 mm to 5.9 mm away from the center of said lid opening and closing member in a horizontal direction, and 0.8 mm to 1.5 mm above the center of said lid opening and closing member in a vertical direction.

* * * * *